(12) United States Patent
Ishikawa et al.

(10) Patent No.: US 11,898,323 B2
(45) Date of Patent: Feb. 13, 2024

(54) CONTROL SYSTEM AND TRAVELING VEHICLE

(71) Applicant: KUBOTA CORPORATION, Osaka (JP)

(72) Inventors: Shinnosuke Ishikawa, Sakai (JP); Susumu Umemoto, Sakai (JP); Ryo Kurata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 791 days.

(21) Appl. No.: 17/016,681

(22) Filed: Sep. 10, 2020

(65) Prior Publication Data

US 2021/0079622 A1 Mar. 18, 2021

(30) Foreign Application Priority Data

Sep. 13, 2019 (JP) .................................. 2019-167312

(51) Int. Cl.
*E02F 9/20* (2006.01)
*G06F 21/30* (2013.01)
*G06F 21/44* (2013.01)

(52) U.S. Cl.
CPC ............ *E02F 9/205* (2013.01); *G06F 21/305* (2013.01); *G06F 21/44* (2013.01)

(58) Field of Classification Search
CPC ......... E02F 9/205; G06F 21/305; G06F 21/44
See application file for complete search history.

(56) References Cited

U.S. PATENT DOCUMENTS

| 2004/0024510 A1 | 2/2004 | Finley et al. |
| 2006/0047393 A1 | 3/2006 | Casey |

(Continued)

FOREIGN PATENT DOCUMENTS

| CN | 106960216 A | 7/2017 |
| DE | 10 2011 120 884 A1 | 6/2013 |

(Continued)

OTHER PUBLICATIONS

Official Communication issued in corresponding European Patent Application No. 20195597.8, dated Feb. 8, 2021.

(Continued)

*Primary Examiner* — Faris S Almatrahi
*Assistant Examiner* — Andrew J Cromer
(74) *Attorney, Agent, or Firm* — Keating & Bennett, LLP

(57) ABSTRACT

A control system to control a work machine and a traveling vehicle traveling with the work machine, includes a first communication device and a second communication device each of which controls operation of the traveling vehicle and at least one of which includes an authenticator to authenticate the work machine by communicating with a third communication device to control operation of the work machine, and a notifier to notify the other one of the first communication device and the second communication device that the authenticator succeeded in authentication, the first communication device and the second communication device each being prohibited, unless the authenticator succeeds in authentication, from at least controlling operation of the traveling vehicle in accordance with information sent from the third communication device.

10 Claims, 5 Drawing Sheets

(56) References Cited

U.S. PATENT DOCUMENTS

| | | | | |
|---|---|---|---|---|
| 2008/0278282 | A1* | 11/2008 | Waldmann | G07C 5/008 340/5.8 |
| 2014/0196109 | A1* | 7/2014 | Jeninga | H04L 63/08 726/2 |
| 2019/0147315 | A1 | 5/2019 | Okamura et al. | |
| 2020/0189387 | A1 | 6/2020 | Yagyu et al. | |

FOREIGN PATENT DOCUMENTS

| | | |
|---|---|---|
| DE | 10 2013 000 088 A1 | 7/2014 |
| JP | 2006-223105 A | 8/2006 |
| JP | 2006-246728 A | 9/2006 |
| JP | 2007-289131 A | 11/2007 |
| JP | 2015-043763 A | 3/2015 |
| JP | 2016-039562 A | 3/2016 |
| JP | 2017-209032 A | 11/2017 |
| JP | 2017-212941 A | 12/2017 |
| JP | 2018-061470 A | 4/2018 |
| JP | 2018-191532 A | 12/2018 |
| JP | 2019-006372 A | 1/2019 |

OTHER PUBLICATIONS

Calcante et al., "Design, development and evaluation of a wireless system for the automatic identification of implements", Computer of Electronics in Agriculture vol. 101, Feb. 1, 2014, pp. 118-127.
Official Communication issued in corresponding Japanese Patent Application No. 2019-167312, dated Aug. 2, 2022.

* cited by examiner

CONTROL SYSTEM AND TRAVELING VEHICLE

CROSS REFERENCE TO RELATED APPLICATIONS

This application claims the benefit of priority under 35 U.S.C. § 119 to Japanese Patent Application No. 2019-167312 filed on Sep. 13, 2019, the entire contents of which are hereby incorporated herein by reference.

BACKGROUND OF THE INVENTION

1. Field of the Invention

The present invention relates to a control system and a traveling vehicle.

2. Description of the Related Art

An agricultural machine is commonly constituted by, for example, a plurality of types of devices such as (i) a vehicle such as a tractor, (ii) a work machine (implement), provided to the vehicle, for actually carrying out farm work, and (iii) an electronic device retrofitted to the vehicle or the work machine. The agricultural machine is commonly made available by combining and customizing these plurality of types of devices in accordance with intended farm work.

As described above, in such an agricultural machine constituted by a combination of a plurality of types of devices, it is a matter of course that devices supplied from different manufacturers are frequently combined. Thus, it is desired that connection compatibility between devices produced by different manufacturers be also guaranteed.

Under the circumstances, ISO 11783, which is an international standard, has been developed mainly in Europe and the United States. The international standard ISO 11783 (i) is a standard that is based on a control area network (CAN) and (ii) is an international standard that defines a communication protocol for exchanging, between a plurality of devices provided in a vehicle or between a vehicle and a work machine, information concerning operation of a device (e.g., an engine speed of a power source or a traveling speed).

The international standard ISO 11783 is (i) promoted by the Agricultural Industry Electronics Foundation (AEF), which is an industrial association, (ii) called ISOBUS, and (ii) made widely popular, as a global standard, mainly among large agricultural machines. Devices that are recognized by AEF to conform to ISOBUS but are different in manufacturer are guaranteed to (i) be connected substantially without any problem and (ii) operate. In recent years, interest in smart agriculture has been developing, and agricultural machines conforming to ISOBUS have been more and more introduced.

SUMMARY OF THE INVENTION

In contrast, as in an agricultural machine, it is not easy to replace a highly expensive device with a new device. Thus, in a transitional period in which a new agricultural machine in which a standardization technique such as ISOBUS is implemented is being made popular, it is strongly desired that a standardization technique be more easily implemented by, while conforming to rules of the standardization technique, achieving a device that can be relatively easily retrofitted also to a conventional agricultural machine.

Preferred embodiments of the present invention provide (i) control systems, and (ii) traveling vehicles, by each of which a standardization technique is capable of being easily implemented.

A control system in accordance with an aspect of a preferred embodiment of the present invention is a control system for controlling a work machine and a traveling vehicle traveling while being provided with the work machine, the control system including a first communication device and a second communication device each to control operation of the traveling vehicle and at least one of which includes an authenticator to authenticate the work machine by communicating with a third communication device, provided in the work machine, to control operation of the work machine, and a notifier to notify the other one of the first communication device and the second communication device that the authenticator succeeded in authentication, the first communication device and the second communication device each being prohibited, unless the authenticator succeeds in authentication, from at least controlling operation of the traveling vehicle in accordance with information sent from the third communication device.

According an aspect of a preferred embodiment of the present invention, while one of the first communication device and the second communication device is carrying out operation related to authentication of a work machine, the other one of the first communication device and the second communication device can carry out other process(es) to control a traveling vehicle. This makes it possible to avoid concentration of a load in a single communication device. As a result, it is unnecessary to require a controller to be high performing, so that a control system can be constructed at low cost. This brings about an effect of allowing a standardization technique to be easily implemented by a control system.

Note here that according to an aspect of a preferred embodiment of the present invention, at least control of operation of the traveling vehicle in accordance with information sent from the third communication device of the work machine is prohibited unless authentication is successful. This (i) makes it impossible for a situation in which a traveling vehicle is controlled by an invalid work machine to occur and (ii) prevents impairment of safety.

Note that the first communication device and the second communication device can, for example, communicate with one or more traveling vehicle control devices so as to collectively control the traveling vehicle via the one or more traveling vehicle control devices, the one or more traveling vehicle control devices each controlling operation of the traveling vehicle. The third communication device can, for example, communicate with one or more work machine control devices so as to collectively control the work machine via the one or more work machine control devices, the one or more work machine control devices each controlling operation of the work machine.

A control system in accordance with an aspect of a preferred embodiment of the present invention can be configured such that the second communication device includes the authenticator and the notifier, and the first communication device includes an information transmitter to send, to the third communication device, traveling vehicle information on the traveling vehicle.

According to an aspect of a preferred embodiment of the present invention, a process related to authentication and a process for sending traveling vehicle information can be carried out by being shared between two communication devices. This makes it possible to distribute a load.

A control system in accordance with an aspect of a preferred embodiment of the present invention can be configured such that the second communication device further includes an information receiver to obtain, from the third communication device of the work machine that has been authenticated by the authenticator, work machine information on the work machine, and an instruction generator to control operation of the traveling vehicle in accordance with the work machine information.

According to an aspect of a preferred embodiment of the present invention, it is possible to avoid concentration of a load in a single communication device by preventing a plurality of functions to be carried out by the single communication device from being simultaneously carried out. For example, (i) a process to obtain work machine information from the work machine and (i) a process to control the traveling vehicle in accordance with the work machine information obtained are not carried out before the authenticator carries out an authentication process. By thus preventing functions to be carried out by a single communication device from being simultaneously carried out, it is possible to avoid concentration of a load in a single communication device.

Alternatively, a control system in accordance with an aspect of a preferred embodiment of the present invention can be configured such that the first communication device further includes a first information receiver to obtain, from the third communication device of the work machine that has been authenticated by the authenticator, first specification information that specifies first operation of the traveling vehicle, and a first instruction generator to control the first operation of the traveling vehicle in accordance with the first specification information, and the second communication device further includes a second information receiver to obtain, from the third communication device of the work machine that has been authenticated by the authenticator, second specification information that specifies second operation of the traveling vehicle, and a second instruction generator to control the second operation of the traveling vehicle in accordance with the second specification information.

According to an aspect of a preferred embodiment of the present invention, the first communication device carries out control with respect to the first operation of the traveling vehicle, and the second communication device carries out control with respect to the second operation of the traveling vehicle. By thus causing functions that may be simultaneously carried out to be shared between or among a plurality of communication devices, it is possible to appropriately distribute a load.

Alternatively, a control system in accordance with an aspect of a preferred embodiment of the present invention can be configured such that the first communication device further includes an information receiver to obtain, from the third communication device of the work machine that has been authenticated by the authenticator, work machine information on the work machine, and an instruction generator to control operation of the traveling vehicle in accordance with the work machine information.

According to the configuration, it is possible to easily implement an authentication function of the work machine merely by carrying out interactive communication with the work machine and providing not only the first communication device to control the traveling vehicle but also the second communication device.

A control system in accordance with an aspect of a preferred embodiment of the present invention can be configured such that the first communication device further includes the authenticator and the notifier, and the first communication device and the second communication device are each prohibited, unless the authenticator of the first communication device and the authenticator of the second communication device both succeed in authentication, from at least controlling operation of the traveling vehicle in accordance with the information sent from the third communication device.

According to the configuration, it is possible to further enhance safety from a risk that the traveling vehicle will be controlled by an invalid work machine.

A traveling vehicle in accordance with an aspect of a preferred embodiment of the present invention includes a first communication device and a second communication device each included in a control system recited above. This brings about an effect of making it possible to easily implement a standardization technique in a control system.

Various aspects of preferred embodiments of the present invention make it possible to easily implement a standardization technique.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Figure 2:
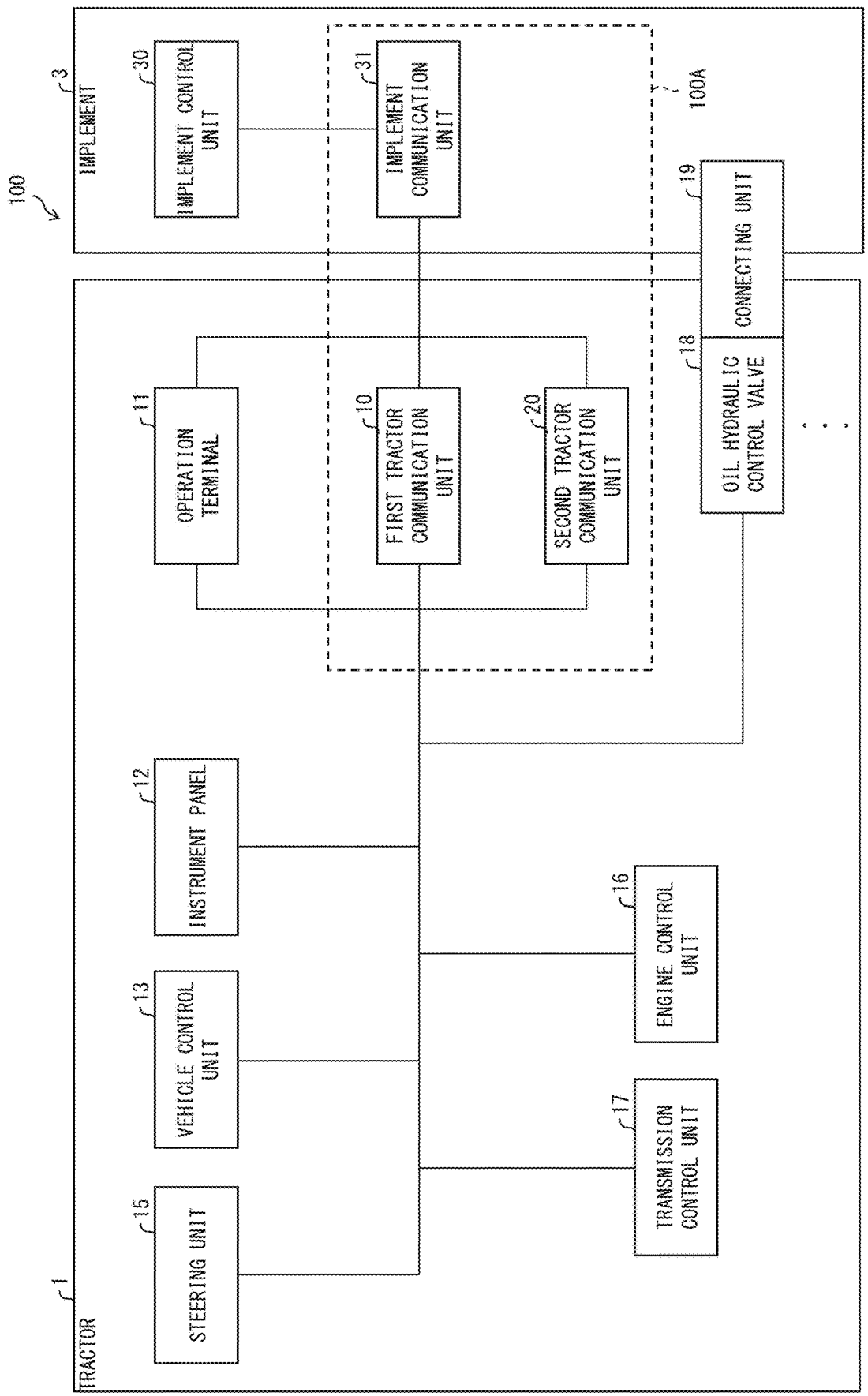
FIG. 2 is a block diagram schematically illustrating a configuration of an agricultural machine and a system for controlling the agricultural machine.

FIG. 2 is a block diagram schematically illustrating a configuration of an agricultural machine and a system for controlling the agricultural machine (hereinafter referred to as an "agricultural machine control system").

For example, an agricultural machine 100 preferably at least includes (i) a tractor 1 (traveling vehicle), which is a traveling vehicle, and (ii) an implement 3 (work machine), which is a work machine to carry out farm work. The agricultural machine 100 can also include other device(s) (not illustrated).

For example, the tractor 1 includes a first tractor communication unit 10 (first communication device), a second tractor communication unit 20 (second communication device), an operation terminal 11, an instrument panel 12, a vehicle control unit 13, a steering unit 15, an engine control unit 16, a transmission control unit 17, and an oil hydraulic control valve 18, each of which is provided in a vehicle. The tractor 1 further includes a connecting unit 19. The connecting unit 19 is provided at the rear of the vehicle in a case where, for example, a direction toward which the vehicle travels is assumed to be the front. Note that the tractor 1 can include other component(s) (not illustrated) that a common tractor includes.

The implement 3 includes an implement communication unit 31 (third communication device) and an implement control unit 30 (work machine control device, ECU). Note that the implement 3 can include other component(s) (not illustrated) that a common implement includes.

The operation terminal 11 is a terminal device that is configured or programmed to cause software to carry out a display process and an input process of the agricultural machine 100. The operation terminal 11 preferably includes and is implemented by, for example, a touch panel. The operation terminal 11 can display information that is specialized in farm work and is more specific than information displayed in the instrument panel 12. The operation terminal 11 is provided, for example, near a driver seat of the tractor 1. With this configuration, while sitting on the driver seat, a driver can carry out a touch operation with respect to the operation terminal 11 so as to (i) cause the operation terminal 11 to display necessary information (e.g., respective current states of the tractor 1 and the implement 3) and (ii) input a necessary instruction to each of the tractor 1 and the implement 3.

The instrument panel 12 is a display system to display basic information on the vehicle, such as fuel for the tractor 1, an engine speed of the tractor 1, and a traveling speed of the tractor 1.

The vehicle control unit 13 (traveling vehicle control device, ECU) is configured or programmed to control sections of the tractor 1 serving as a traveling vehicle. For example, in accordance with (i) an instruction from the steering unit 15 that the driver operates or (ii) an instruction from at least one of the first tractor communication unit 10 and the second tractor communication unit 20, the vehicle control unit 13 controls, for example, (a) the engine control unit 16 that controls driving of an engine and (b) the transmission control unit 17 that controls driving of a transmission.

The steering unit 15 is an input system that allows the driver to operate the tractor 1. The steering unit 15 includes, for example, a steering wheel, a shift lever, a brake, a switch, and a dial. The steering unit 15 may also control steering during automatic driving.

The oil hydraulic control valve 18 is a mechanism to control an oil hydraulic pressure serving as a power source of the connecting unit 19. The oil hydraulic control valve 18 controls, for example, a pressure, a flow rate, and a direction of a fluid (here, oil) in accordance with an instruction from at least one of the first tractor communication unit 10 and the second tractor communication unit 20. Thus, operation and a posture of the connecting unit 19 are controlled.

The connecting unit 19 is a mechanism to physically connect the tractor 1 and the implement 3. In Preferred Embodiment 1, the connecting unit 19 is, for example, a three point linkage mechanism disclosed in Japanese Patent Application Publication Tokukai No. 2019-6372 (Publication date: Jan. 17, 2019).

The first tractor communication unit 10 and the second tractor communication unit 20 each carry out mutual communication with the implement communication unit 31 of the implement 3. The mutual communication can be, for example, communication that conforms to ISO11783, which is an international standard. Agricultural Industry Electronics Foundation (AEF), which is an industrial association, has made ISO11783 widely popular, as a global standard, mainly among large agricultural machines. Furthermore, a tractor implement management (TIM) system is provided in an agricultural machine control system 100A. The TIM refers to a technique for precisely controlling a tractor and an implement by (i) guaranteeing compatibility between the tractor and the implement, which are products made by different manufacturers, and (ii) achieving interactive communication. The agricultural machine control system 100A, in which the TIM system is provided, allows a control signal from the implement 3 to be received by at least one of the first tractor communication unit 10 and the second tractor communication unit 20. In accordance with the control signal, the vehicle control unit 13 can carry out, for example, (i) speed control with respect to the tractor 1 and (ii) height control with respect to the connecting unit 19.

The implement control unit 30 (a third control device) is configured or programmed to collectively control sections of the implement 3. The implement control unit 30 controls operation of the implement 3 and sends necessary information to the tractor 1 via the implement communication unit 31.

The control units (described earlier) and the communication units (described earlier) are typically electronic control units (ECUs). The ECUs preferably each include (i) hardware such as a central processing unit (CPU), a communication dedicated circuit, a digital signal input circuit, a digital signal output circuit, and an analog signal input circuit and (ii) a storage device in which various pieces of software such as a control program or programs are stored. Furthermore, the ECUs are connected by, for example, the international standard ISO11783 that is called ISOBUS and based on a control area network (CAN).

The first tractor communication unit 10 and the second tractor communication unit 20 each operate in conformity with ISOBUS. A configuration of a main portion of the sections of the first tractor communication unit 10 and the second tractor communication unit 20 in accordance with Preferred Embodiment 1 will be specifically described later with reference to FIG. 1.

Figure 1:
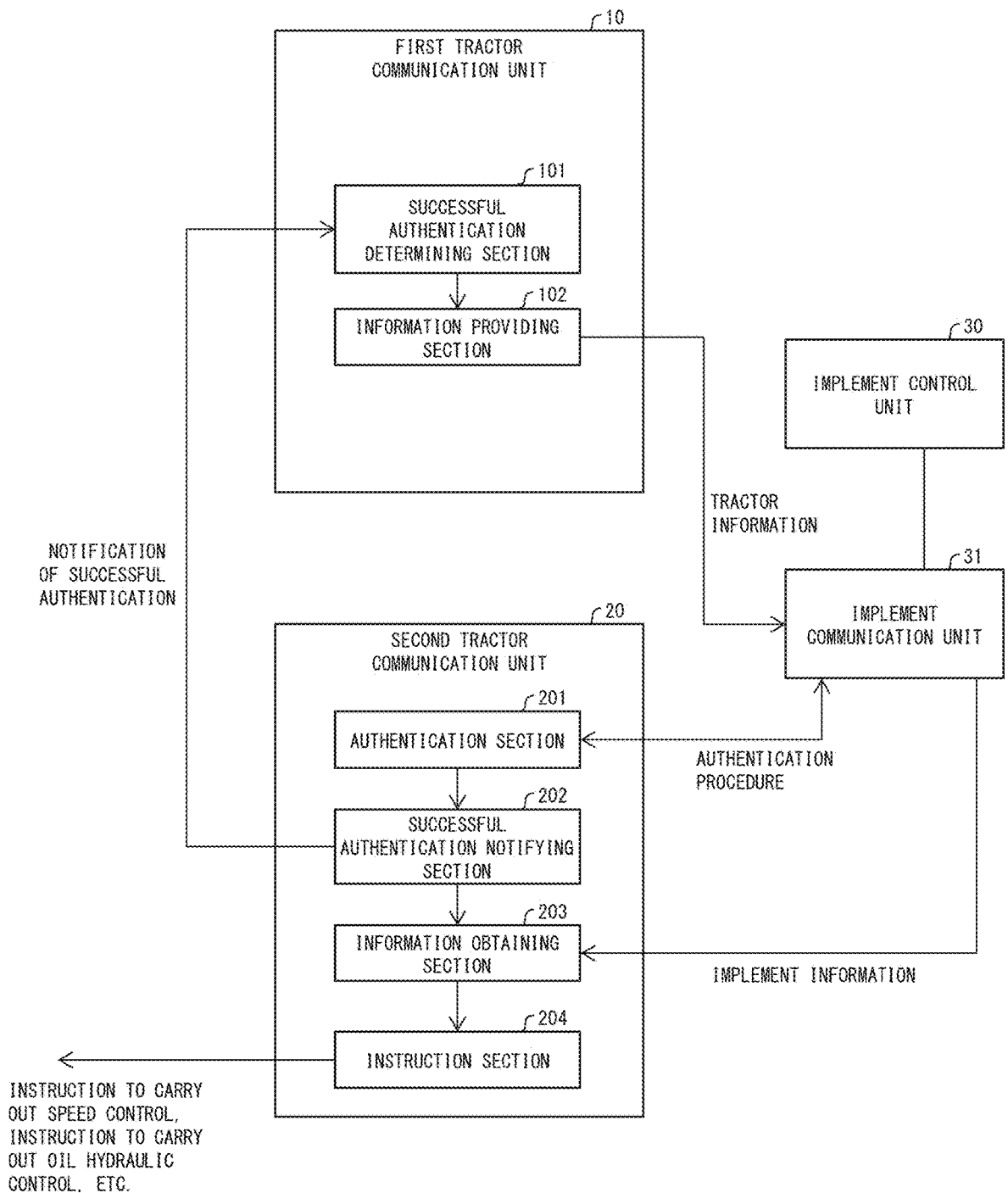
FIG. 1 is a block diagram illustrating a configuration of a main portion of a tractor control section.

FIG. 1 is a block diagram illustrating the configuration of the main portion of the first tractor communication unit 10 and the second tractor communication unit 20 in accordance with an aspect of the present disclosure. In Preferred Embodiment 1, the first tractor communication unit 10 (first communication device) is configured or programmed to include, for example, a successful authentication determining section 101 and an information providing section 102. The second tractor communication unit 20 (second communication device) is configured or programmed to include, for example, an authentication section 201, a successful authentication notifying section 202, an information obtaining section 203, and an instruction section 204.

The above-described sections of the first tractor communication unit 10 and the second tractor communication unit 20 can be realized in a case where a CPU (not illustrated) reads out, to, for example, a random access memory (RAM) (not illustrated), a program or programs stored in a storage device (not illustrated).

The successful authentication determining section 101 of the first tractor communication unit 10 determines whether the implement 3 that is communicably connected to the tractor 1 has been authenticated, by the authentication section 201 (described later), as a valid communication partner. For example, the successful authentication determining section 101 that has received a notification of successful authentication from the second tractor communication unit 20 can determine that authentication of the implement 3 was successful. Unless validity of the implement 3 is determined, the successful authentication determining section 101 can partially or totally prohibit the information providing section 102 from providing information to the implement 3. In this case, in a case where validity of the implement 3 has been determined, the successful authentication determining section 101 permits the information providing section 102 to provide information to the implement 3.

The information providing section 102 communicates with the implement 3, which is connected to the tractor 1, so as to send, to the implement 3, tractor information (traveling vehicle information) indicative of various pieces of information on the tractor 1. The information providing section 102 that is prohibited from providing information sends no tractor information. The information providing section 102 that has been permitted by the successful authentication determining section 101 to provide information sends the tractor information to the implement 3. In Preferred Embodiment 1, for example, the information providing section 102 can be configured to carry out at least a portion of the functions defined in ISOBUS Classes 1 and 2. Immediately after connection, the information providing section 102 can send, without waiting for successful authentication, partial information to the implement control unit 30, the partial information being included in the tractor information and being not prohibited from being provided.

The authentication section 201 of the second tractor communication unit 20 authenticates the implement 3 that is communicably connected to the tractor 1. Note that an authentication method carried out by the authentication section 201 can be, for example, a publicly known authentication method such as public key cryptography or secret key cryptography. Assume, for example, that in the agricultural machine control system 100A, a TIM system is implemented, and a standard cryptographic authentication method of TIM is used.

In a case where the authentication section 201 has authenticated the implement 3, which is connected to the tractor 1, as a valid communication partner, the successful authentication notifying section 202 (notification section) sends, to the successful authentication determining section 101 of the first tractor communication unit 10, a notification of successful authentication which notification notifies that authentication was successful. A signal of this notification of successful authentication is, for example, sent from the first tractor communication unit 10 to the second tractor communication unit 20 via ISOBUS (CAN-BUS) by which to connect the first tractor communication unit 10 and the second tractor communication unit 20.

The successful authentication notifying section 202 also controls operation of the information obtaining section 203. Specifically, unless validity of the implement 3 is determined, the successful authentication notifying section 202 prohibits the information obtaining section 203 from obtaining information from the implement 3. In a case where validity of the implement 3 has been determined, the successful authentication notifying section 202 permits the information obtaining section 203 to obtain information from the implement 3.

The information obtaining section 203 communicates with the implement 3, which is connected to the tractor 1, so as to obtain, from the implement 3, implement information (work machine information) indicative of various pieces of information on the implement 3. The information obtaining section 203 that is prohibited from obtaining information receives no implement information. The information obtaining section 203 that has been permitted by the successful authentication notifying section 202 to obtain information receives the implement information from the implement 3. In Preferred Embodiment 1, for example, the information obtaining section 203 can be configured or programmed to carry out at least a portion of the functions defined in ISOBUS Class 3, including a TIM function.

In accordance with the implement information that has been obtained by the information obtaining section 203, the instruction section 204 instructs each of the components of the tractor 1, which components are illustrated in FIG. 2, to control operation of the tractor 1. For example, the instruction section 204 (i) supplies, to the vehicle control unit 13, an instruction to carry out speed control, so that a speed of the tractor 1 is controlled, and (ii) supplies, to the oil hydraulic control valve 18, an instruction to carry out oil hydraulic control, so that a pressure, a flow rate, or a direction of a fluid is controlled.

Figure 3:
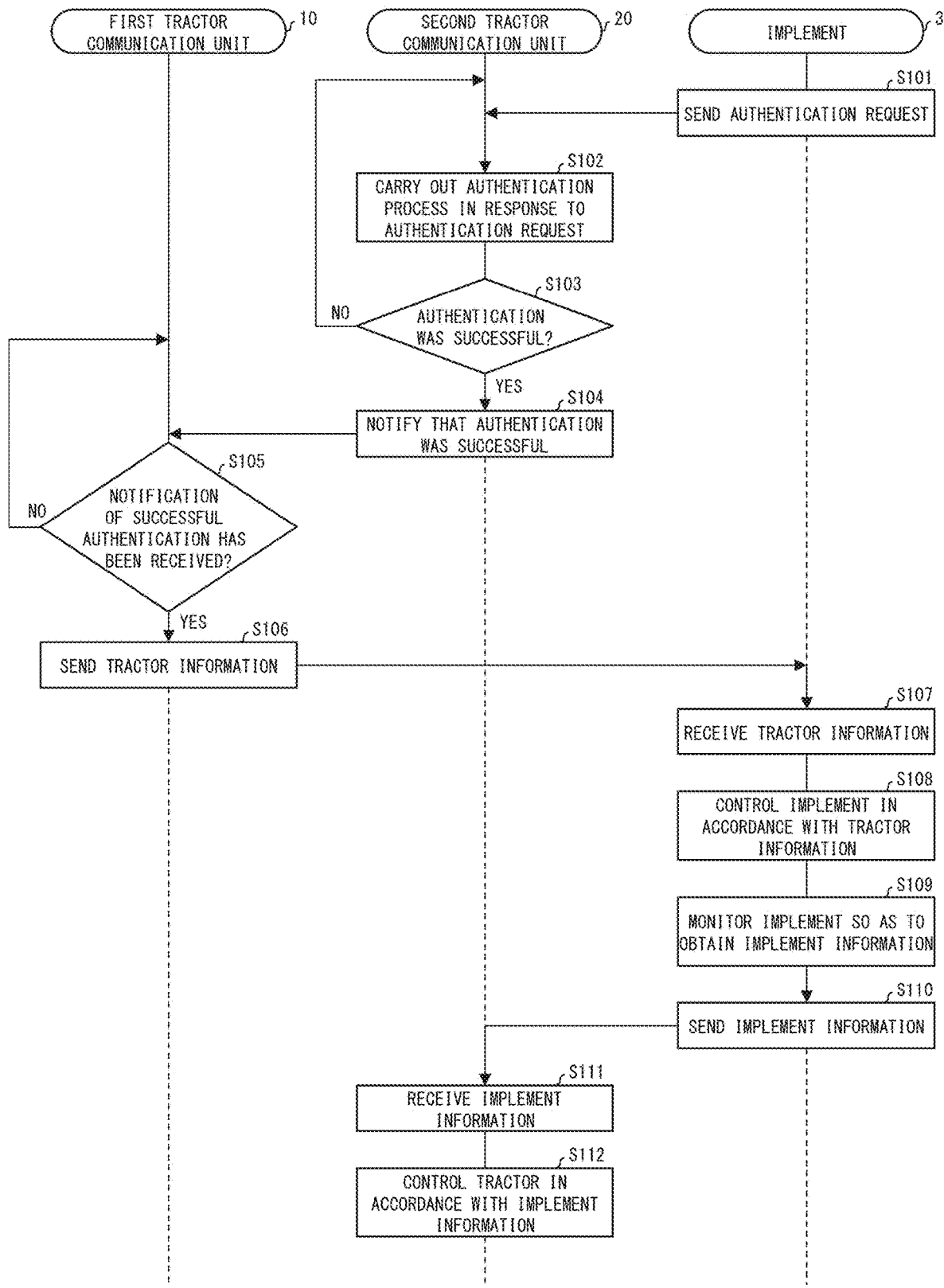
FIG. 3 is a flowchart showing a flow of a process carried out by an agricultural machine control system.

FIG. 3 is a flowchart illustrating a flow of a process carried out by an agricultural machine control system. Note that the following series of processes is started, for example, in a case where (i) the first tractor communication unit 10 and the second tractor communication unit 20 of the tractor 1 and (ii) the implement communication unit 31 of the implement 3 are connected and then are turned on so that their existence is electrically recognized. In Preferred Embodiment 1, assume, for example, that a result of authentication carried out through the following series of processes is effective until a communication partner is made unrecognizable by turning off or disconnecting the components (described earlier).

In S101, the implement communication unit 31 sends, to the second tractor communication unit 20, an authentication request message that requests the second tractor communication unit 20 to carry out authentication. In a case where public key cryptography is used as an example of the authentication method, for example, the implement communication unit 31 (i) generates data obtained by encoding, with use of a secret key thereof, identification information that identifies the implement 3 and (ii) sends, to the second tractor communication unit 20, the data, which serves as the authentication request message. For example, the standard cryptographic authentication method of TIM can be used for authentication.

In S102, the authentication section 201 of the second tractor communication unit 20 responds to an authentication request so as to carry out the authentication process. For example, the authentication section 201 decodes, with use of a public key, the authentication request message received, the public key having been obtained in advance and made public by the implement 3 that is valid.

In S103, the authentication section 201 determines whether authentication was successful. For example, the authentication section 201 that has succeeded in decoding the authentication request message with use of the public key (described earlier) determines that authentication was successful, and proceeds from YES in S103 to S104. In contrast, the authentication section 201 that has failed to decode the authentication request message with use of the public key (described earlier) determines that authentication was unsuccessful, and returns from NO in S103 to a step prior to S102 so as to transition to a state of waiting for the authentication request message. Here, the authentication section 201 can return, to the implement communication unit 31 that has requested authentication, (i) a message that notifies that authentication was unsuccessful and (ii) a message that requests resending of the authentication request message.

In S104, the successful authentication notifying section 202 sends, to the first tractor communication unit 10, the notification of successful authentication which notification notifies that authentication was successful. The notification of successful authentication can include the identification information that has been decoded and by which the implement 3 that is valid has been identified. Here, the successful authentication notifying section 202 notifies the information obtaining section 203 of successful authentication so as to permit the information obtaining section 203 to obtain the implement information. Furthermore, here, the successful authentication notifying section 202 can send the notification of successful authentication also to the implement communication unit 31.

In S105, the successful authentication determining section 101 of the first tractor communication unit 10 receives the notification of successful authentication, which notification has been sent from the second tractor communication unit 20 via CAN-BUS. In a case where the successful authentication determining section 101 has received the notification of successful authentication, the process proceeds from YES in S105 to S106.

In S106, the information providing section 102 sends the tractor information to the implement communication unit 31. With the configuration, the tractor information is, as necessary, passed to the implement communication unit 31 and supplied to the implement control unit 30 via the implement communication unit 31.

In S107, the implement communication unit 31 receives the tractor information from the first tractor communication unit 10.

In S108, the implement control unit 30 controls the sections of the implement 3 in accordance with details of the tractor information that has been received by the implement communication unit 31.

In S109, the implement control unit 30 monitors an operating state of the implement 3 via, for example, a sensor so as to obtain the implement information. The implement control unit 30 can obtain, as it is, a detected value detected by the sensor, the detected value serving as the implement information. Alternatively, the implement control unit 30 can generate a result of information processing carried out in accordance with the detected value, the result serving as the implement information.

In S110, the implement control unit 30 sends the implement information to the second tractor communication unit 20 via the implement communication unit 31. The implement information can include, for example, request information (first specification information) that specifies a traveling speed of the tractor 1.

In S111, the information obtaining section 203 of the second tractor communication unit 20 receives the implement information.

In S112, the instruction section 204 sends control information of the tractor 1 to the vehicle control unit 13 in accordance with details of the implement information so that the vehicle control unit 13 controls the tractor 1. For example, in a case where (i) the implement information is the request information that specifies a traveling speed of the tractor 1 and (ii) it is possible, as a result of checking of a state around the tractor 1, for the tractor 1 to travel at the traveling speed specified, the vehicle control unit 13 controls the tractor 1 so that the tractor 1 travels at the traveling speed specified.

According to the configuration and the method each described earlier, it is possible to reduce a load of a single CPU by appropriately causing functions of the tractor 1 to be shared between the first tractor communication unit 10 and the second tractor communication unit 20. Furthermore, since the tractor 1 includes a plurality of channels for signals that are exchanged between or among the components of the tractor 1, it is possible to avoid a delay in communication while reducing a load of CAN communication.

More specifically, in Preferred Embodiment 1, since the first tractor communication unit 10 carries out a function to pass the tractor information to the implement 3, and the second tractor communication unit 20 carries out a function to draw the implement information from the implement 3, it is possible to avoid a processing load of a single CPU during downlink transfer and during uplink transfer.

Furthermore, in Preferred Embodiment 1, in order to carry out a technique (tractor implement management (TIM)) to precisely control a tractor and an implement by (i) guaranteeing compatibility between the tractor and the implement, which are products different in manufacturer, and (ii) achieving interactive communication, it is possible to distribute a load of a CPU to the first tractor communication unit 10 and the second tractor communication unit 20 by causing the second tractor communication unit 20 to have a necessary security function (e.g., the authentication section 201).

The security function is mainly a function for the authentication section 201 to communicate with the implement communication unit 31 so as to authenticate the implement 3 as a valid communication partner. Such authentication is a procedure that needs to be carried out so that the implement 3 sends the implement information to the tractor 1 so as to guarantee that the tractor 1 will be safely controlled. An authentication procedure is an extremely heavy process and thus applies a high load to a CPU. Note, however, that it is possible to distribute a load of a CPU by thus distributing the authentication procedure between the first actor communication unit 10 and the second tractor communication unit 2 so as to carry out communication.

Furthermore, according to the configuration and the method each described earlier, merely by adding, to an existing system that is unprepared for TIM, the second tractor communication unit 20 that is capable of TIM authentication, the existing system can be easily extended to an agricultural machine control system capable of achieving TIM. An aspect of a preferred embodiment of the present disclosure thus brings about an effect of making it possible to easily carry out retrofitted implementation of a standardization technique with respect to an existing agricultural machine.

Preferred Embodiment 2

The following description will specifically discuss a further preferred embodiment of the present invention. Note that for convenience, members having functions identical to those of the respective members described in Preferred Embodiment 1 are given respective identical reference numerals, and a description of those members is omitted.

Figure 4:
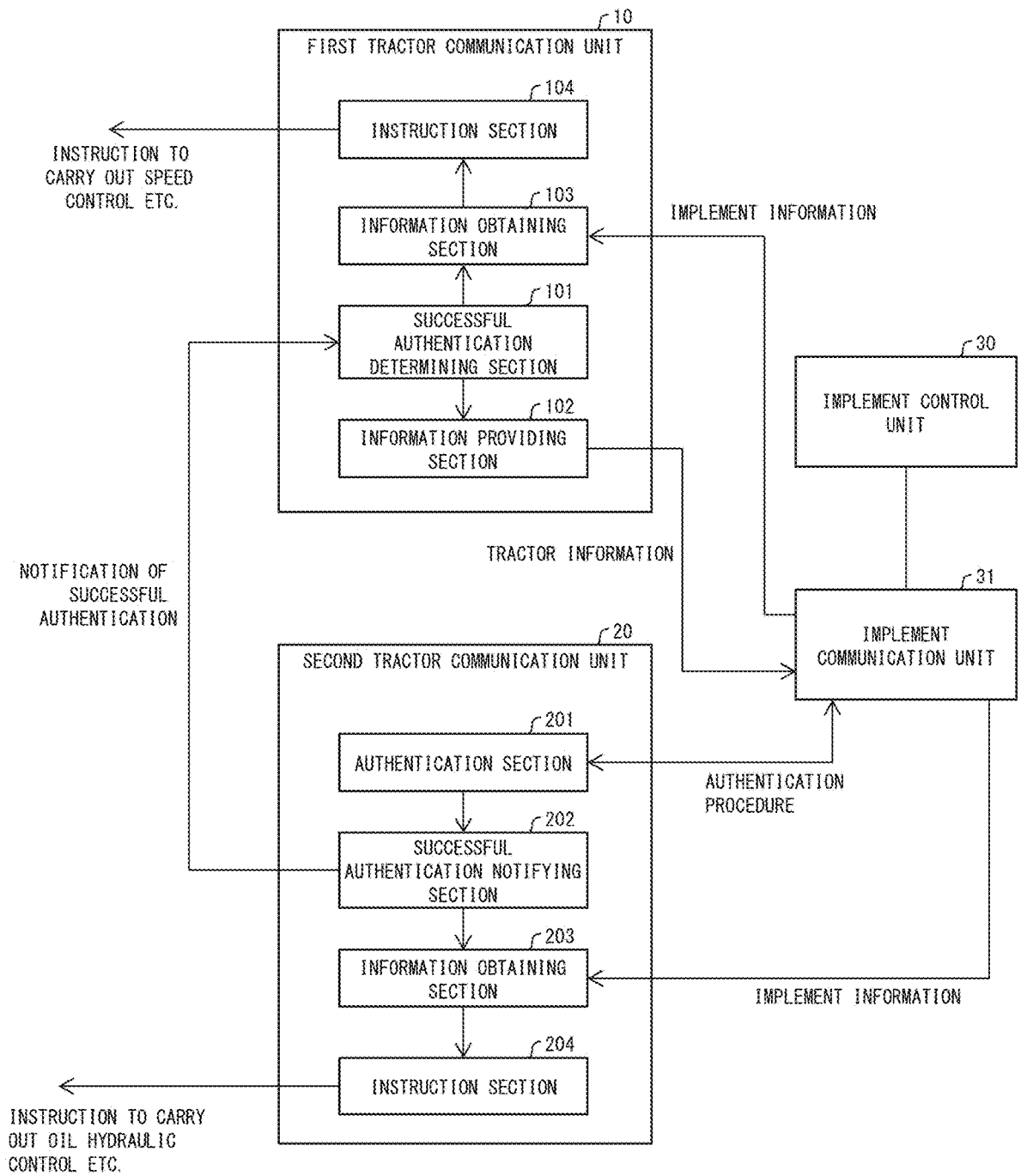
FIG. 4 is a block diagram illustrating another example of the configuration of the main portion of the tractor control section.

FIG. 4 is a block diagram illustrating a configuration of a main portion of a first tractor communication unit 10 and a second tractor communication unit 20 in accordance with an aspect of the present disclosure. Preferred Embodiment 2 differs from Preferred Embodiment 1 in the following point. Specifically, the first tractor communication unit 10 is configured or programmed to further include an information obtaining section 103 (first information obtaining section) and an instruction section 104 (first instruction section).

The information obtaining section 103 communicates with an implement 3, which is connected to a tractor 1, so as to obtain, from the implement 3, implement information indicative of various pieces of information on the implement 3. The information obtaining section 103 that is prohibited by a successful authentication determining section 101 from obtaining information receives no implement information. The information obtaining section 103 that has been permitted by the successful authentication determining section 101 to obtain information receives the implement information from the implement 3. In Preferred Embodiment 2, for example, the information obtaining section 103 can be configured or programmed to carry out at least a portion of the functions defined in ISOBUS Class 3, including a TIM function. In Preferred Embodiment 2, the implement information is, for example, request information that specifies a traveling speed of the tractor 1.

In accordance with the implement information that has been obtained by the information obtaining section 103, the instruction section 104 sends, to each of the components of the tractor 1, which components are illustrated in FIG. 2, e.g., to a vehicle control unit 13, a control signal related to operation of the tractor 1. In Preferred Embodiment 2, for example, the instruction section 104 supplies, to the vehicle control unit 13, an instruction to carry out speed control, so that a speed of the tractor 1 is controlled.

In Preferred Embodiment 2, an information obtaining section 203 (second information obtaining section) of the second tractor communication unit 20 obtains the implement information, which is, for example, (i) information that specifies a length of a top link of a connecting unit 19 serving as a three point linkage mechanism (second specification information) and (ii) information that specifies a rotational speed of a power take-off (PTO).

In Preferred Embodiment 2, in accordance with the length of the top link which length has been specified, the instruction section 204 (second instruction section) (i) outputs an instruction to carry out oil hydraulic control, (ii) controls an oil hydraulic control valve 18, and (iii) adjusts the length of the top link.

According to the configuration described earlier, it is possible to reduce a load of a single CPU by appropriately causing functions of the tractor 1 to be shared between the first tractor communication unit 10 and the second tractor communication unit 20. Furthermore, since the tractor 1 includes a plurality of channels through which to send signals that are exchanged between or among the components of the tractor 1, it is possible to avoid a delay in communication while reducing a load of CAN communication.

More specifically, in Preferred Embodiment 2, the first tractor communication unit 10 carries out a function to pass tractor information to the implement 3, and the second tractor communication unit 20 carries out a security function for achieving TIM. By thus causing operations that may be simultaneously carried out to be shared between or among two or more CPUs, it is possible to distribute a load of each CPU.

Furthermore, in Preferred Embodiment 2, while an agricultural machine 100 is traveling, a speed control-related signal is caused to flow through a first channel, whereas an oil hydraulic control-related signal is caused to flow through a second channel. The first channel is a channel through which the speed control-related signal flows from the implement 3 to the tractor 1 via the first tractor communication unit 10. The second channel is a channel through which the oil hydraulic control-related signal flows from the implement 3 to the tractor 1 via the second tractor communication unit 20. With the configuration, it is possible to more appropriately distribute a load of each CPU by, while the agricultural machine 100 is traveling, causing operations that may be simultaneously carried out to be shared between or among two or more CPUs.

As described earlier, it is possible to avoid concentration of a load in a single CPU. This brings about a particularly remarkable effect of drastically reducing a cost burden on a user in order to free a tractor control section from a high level of demand for performance and achieve TIM in the field of agricultural machines.

Preferred Embodiment 3

The following description will specifically discuss a further preferred embodiment of the present invention. Note that for convenience, members having functions identical to those of the respective members described in Preferred Embodiments 1 and 2 are given respective identical reference numerals, and a description of those members is omitted.

Figure 5:
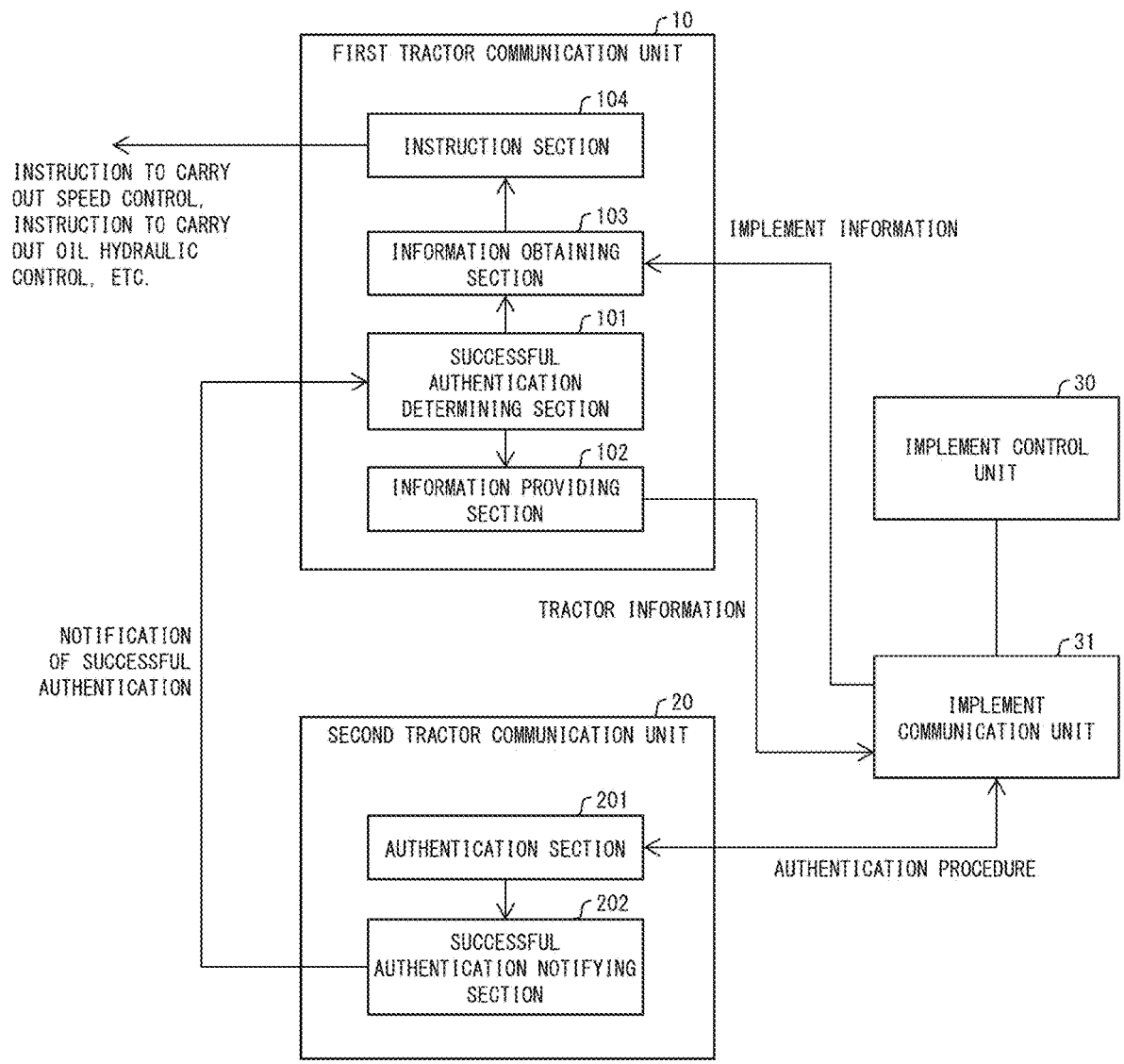
FIG. 5 is a block diagram illustrating still another example of the configuration of the main portion of the tractor control section.

FIG. 5 is a block diagram illustrating a configuration of a main portion of a first tractor communication unit 10 and a second tractor communication unit 20 in accordance with an aspect of the present disclosure. Preferred Embodiment 3 differs from Preferred Embodiment 2 in the following point. Specifically, the second tractor communication unit 20 is configured or programmed to include no information obtaining section 203 and no instruction section 204, and the functions carried out by the information obtaining section 203 and the instruction section 204 of Preferred Embodiment 2 are carried out by an information obtaining section 103 and an instruction section 104, respectively, of the first tractor communication unit 10.

According to the configuration described earlier, merely by adding the second tractor communication unit 20 to an agricultural machine control system that is prepared for ISOBUS Class 3, it is possible to easily add, to the agricultural machine control system, a security function that is necessary for achievement of TIM. An aspect of a preferred embodiment of the present disclosure thus brings about an effect of making it possible to easily carry out retrofitted implementation of a standardization technique.

In each of Preferred Embodiments described earlier, the second tractor communication unit 20 is provided in the tractor 1. Note, however, that the second tractor communication unit 20 can be alternatively provided in the implement 3.

Not only the second tractor communication unit 20 but also the first tractor communication unit 10 can include the authentication section 201 and the successful authentication notifying section 202. In this case, an arrangement can be made between respective CPUs of the first tractor communication unit 10 and the second tractor communication unit 20 so that a CPU that is lower in load carries out the authentication process in accordance with a situation. Alternatively, the authentication process can be carried out by both the first tractor communication unit 10 and the second tractor communication unit so that the security function is further enhanced. Specifically, the first tractor communication unit 10 and the second tractor communication unit 20 include respective authentication sections 201. The information obtaining section 203 and the information obtaining section 103 can be configured to, in a case where the authentication sections 201 both succeeded in authenticating the implement 3, obtain the implement information from the implement 3 that has been authenticated. With the configuration, it is possible to more reliably protect the tractor 1 from a risk that the tractor 1 will be controlled by the implement 3 that is malicious and invalid. This allows the agricultural machine 100 to be used with higher safety.

Control blocks (particularly, the successful authentication determining section 101, the information providing section 102, the information obtaining section 103, the instruction section 104, the authentication section 201, the successful authentication notifying section 202, the information obtaining section 203, and the instruction section 204) of the first tractor communication unit 10 and the second tractor communication unit 20 can be realized by a logic circuit (hardware) provided in an integrated circuit (IC chip) or the like or can be alternatively realized by software.

In the latter case, the first tractor communication unit 10 and the second tractor communication unit 20 each include a computer configured or programmed to execute instructions of a program that is software realizing the foregoing functions. The computer not only includes, for example, at least one processor but also includes a storage medium in which the program is computer-readably recorded. A preferred embodiment of the present invention can include the processor reading and executing, in the computer, the program stored in the storage medium. Examples of the processor include a central processing unit (CPU). Examples of the storage medium encompass "a non-transitory tangible medium" such as not only a read only memory (ROM) but also a tape, a disk, a card, a semiconductor memory, and a programmable logic circuit. The computer can further include, for example, a random access memory (RAM). The program can be supplied to or made available to the computer via any transmission medium (such as a communication network or a broadcast wave) which allows the program to be transmitted. Note that an aspect of a preferred embodiment of the present invention can also be achieved in the form of a computer data signal in which the program is embodied via electronic transmission and which is embedded in a carrier wave.

The present invention is not limited to the preferred embodiments, but can be altered by a skilled person in the art within the scope of the claims. The present invention also encompasses, in its technical scope, any preferred embodiment derived by combining technical features disclosed in differing preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system for controlling a work machine and a traveling vehicle traveling while being provided with the work machine, the control system comprising:
    a first computer configured or programmed to define and function as a first communication device and a second computer configured or programmed to define and function as a second communication device each to independently give an instruction to a traveling vehicle control device that controls operation of the traveling vehicle, the first communication device and the second communication device being mutually communicable with each other, and at least one of the first communication device and the second communication device being configured or programmed to include:
    an authenticator to authenticate the work machine by communicating with a third communication device to provide an instruction to a work machine control device, provided in the work machine, that controls operation of the work machine;
    a notifier to notify the other one of the first communication device and the second communication device that the authenticator succeeded in authentication; and
    the first communication device and the second communication device each being prohibited, unless the authenticator succeeds in authentication, from at least controlling operation of the traveling vehicle in accordance with information sent from the third communication device.

2. The control system as set forth in claim 1, wherein
    the second communication device is configured or programmed to include the authenticator and the notifier; and
    the first communication device is configured or programmed to include an information transmitter to send, to the third communication device, traveling vehicle information on the traveling vehicle.

3. The control system as set forth in claim 2, wherein the second communication device is configured or programmed to further include:
    an information receiver to obtain, from the third communication device of the work machine that has been authenticated by the authenticator, work machine information on the work machine; and
    an instruction generator to control operation of the traveling vehicle in accordance with the work machine information.

4. The control system as set forth in claim 2, wherein the first communication device is configured or programmed to further include:
    a first information receiver to obtain, from the third communication device of the work machine that has been authenticated by the authenticator, first specification information that specifies first operation of the traveling vehicle; and
    a first instruction generator to control the first operation of the traveling vehicle in accordance with the first specification information; and
    the second communication device is configured or programmed to further include:
    a second information receiver configured to obtain, from the third communication device of the work machine that has been authenticated by the authenticator, second specification information that specifies second operation of the traveling vehicle; and
    a second instruction generator to control the second operation of the traveling vehicle in accordance with the second specification information.

5. The control system as set forth in claim 2, wherein the first communication device is configured or programmed to further include:
    an information receiver to obtain, from the third communication device of the work machine that has been authenticated by the authenticator, work machine information on the work machine; and
    an instruction generator to control operation of the traveling vehicle in accordance with the work machine information.

6. The control system as set forth in claim 2, wherein
    the first communication device is configured or programmed to further include the authenticator and the notifier; and the first communication device and the second communication device are each prohibited, unless the authenticator of the first communication device and the authenticator of the second communication device both succeed in authentication, from at least controlling operation of the traveling vehicle in accordance with the information sent from the third communication device.

7. A traveling vehicle comprising the control system as set forth in claim 1.

8. The control system as set forth in claim 1, wherein
the first communication device includes a successful authentication determining section to determine that the authentication was successful when receiving, from the second communication device, a notification notifying that the authentication was successful.

9. The control system as set forth in claim 1, wherein
each of the first communication device and the second communication device is communicable with the third communication device.

10. The control system as set forth in claim 4, wherein
the first specification information includes information that specifies a traveling speed of the traveling vehicle; and
the second specification information includes information that specifies operation of a connecting unit connecting the traveling vehicle and the work machine.

* * * * *